United States Patent
DeLuga et al.

(10) Patent No.: US 7,333,325 B2
(45) Date of Patent: Feb. 19, 2008

(54) BATTERY FOR DOCKABLE ELECTRONIC DEVICE

(75) Inventors: Ronald E. DeLuga, Spring, TX (US); Earl Moore, Cypress, TX (US); Paul Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 358 days.

(21) Appl. No.: 10/965,055

(22) Filed: Oct. 14, 2004

(65) Prior Publication Data

US 2006/0082959 A1 Apr. 20, 2006

(51) Int. Cl.
*H05K 5/00* (2006.01)
*H01M 2/10* (2006.01)

(52) U.S. Cl. ........................ 361/683; 361/686; 429/99; 429/100; 429/123

(58) Field of Classification Search ........ 361/679–687, 361/724–727; 429/96–100, 123; 710/303–304
See application file for complete search history.

(56) References Cited

U.S. PATENT DOCUMENTS

| | | | |
|---|---|---|---|
| 5,450,271 A * | 9/1995 | Fukushima et al. | 361/686 |
| 5,627,450 A | 5/1997 | Ryan et al. | |
| 5,826,042 A | 10/1998 | Kirkendoll | |
| 5,901,035 A | 5/1999 | Foster et al. | |
| 6,046,571 A | 4/2000 | Bovio et al. | |
| 6,563,702 B1 * | 5/2003 | Shin et al. | 361/686 |
| 6,617,063 B1 * | 9/2003 | Ohnishi | 429/7 |
| 6,742,070 B2 * | 5/2004 | Fuchida | 710/303 |

* cited by examiner

Primary Examiner—Jayprakash Gandhi
Assistant Examiner—Zachary M Pape

(57) ABSTRACT

A battery for a dockable electronic device is provided. The battery includes a housing having a recess, and at least one battery cell disposed in the housing. The recess of the housing is operable to receive a docking station platform when the dockable electronic device is docked at the docking station while the housing is coupled to a bottom surface of the dockable electronic device.

7 Claims, 3 Drawing Sheets

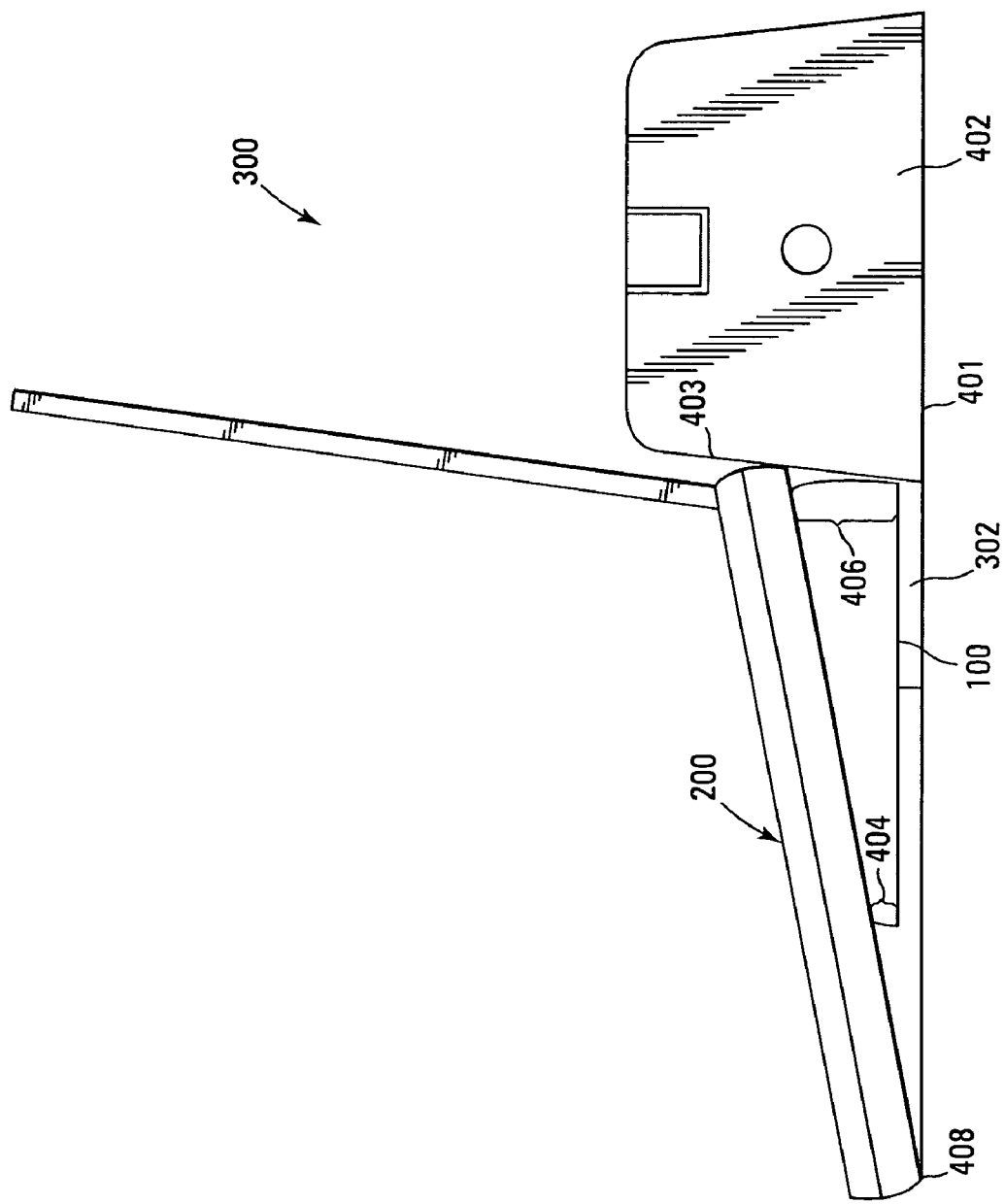

BATTERY FOR DOCKABLE ELECTRONIC DEVICE

BACKGROUND

Notebook computers conventionally operate on either line power or battery power. When operating on battery power, the battery discharges over time until it is unable to provide sufficient power to run the notebook computer. This discharge time is referred to as the battery life. In designing notebook computers, there is a tradeoff between size of battery for increased battery life and the size and weight of the notebook computer.

Although there have been many advances in battery technology over the years, longer battery life is generally provided by increasing the number of cells in the battery. This increases both the weight and size of the notebook computer.

To provide flexible battery operation, many manufacturers offer high capacity batteries in addition to lower capacity, internal batteries. For some notebook computers, the high capacity batteries connect to the bottom of the notebook computer while others fit in the space of the lower capacity battery and extend outside the notebook computer's normal profile. When extended battery life is not needed, the high capacity battery can be removed and replaced with the lower capacity battery. Higher capacity batteries typically have more cells than the notebook's internal battery. This also means that the battery has a larger profile compared to the lower capacity battery.

Unfortunately, notebook computers often cannot dock in docking stations when an external high capacity battery is connected to the notebook computer because the battery interferes with the interface between the notebook computer and the docking station. Convenience-minded users have found this unacceptable. Some manufacturers have attempted to address this problem by modifying the design of their docking stations. These modifications are often implemented at the expense of the ergonomic layout of the docking station and/or additional equipment and cost. Further, some solutions introduce other problems such as reduced heat dissipation and the like.

SUMMARY

Embodiments of the present invention enable a dockable device to be docked in a docking station while bearing a high capacity battery. In one embodiment, A battery for a dockable electronic device is provided. The battery includes a housing having a recess, and at least one battery cell disposed in the housing. The recess of the housing is operable to receive a docking station platform when the dockable electronic device is docked at the docking station while the housing is coupled to a bottom surface of the dockable electronic device.

In another embodiment, a battery for a notebook computer is provided. The battery includes a housing having a transverse member having opposite ends, a first lateral member that extends from one end of the transverse member, a second lateral member that extends from another end of the transverse member, and at least one battery cell disposed in the housing. The transverse member and the first and second lateral members of the housing form a recess that is operable to receive a docking station platform while the housing is coupled to the notebook computer and the notebook computer is docked.

BRIEF DESCRIPTION OF THE DRAWINGS

FIG. 4 is a side view of an embodiment of a notebook computer docked in a docking station with an embodiment of an external battery attached to the notebook computer.

DETAILED DESCRIPTION

In the following detailed description, reference is made to the accompanying drawings that form a part hereof, and in which is shown by way of illustration specific illustrative embodiments in which the teachings of the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention.

Figure 1:
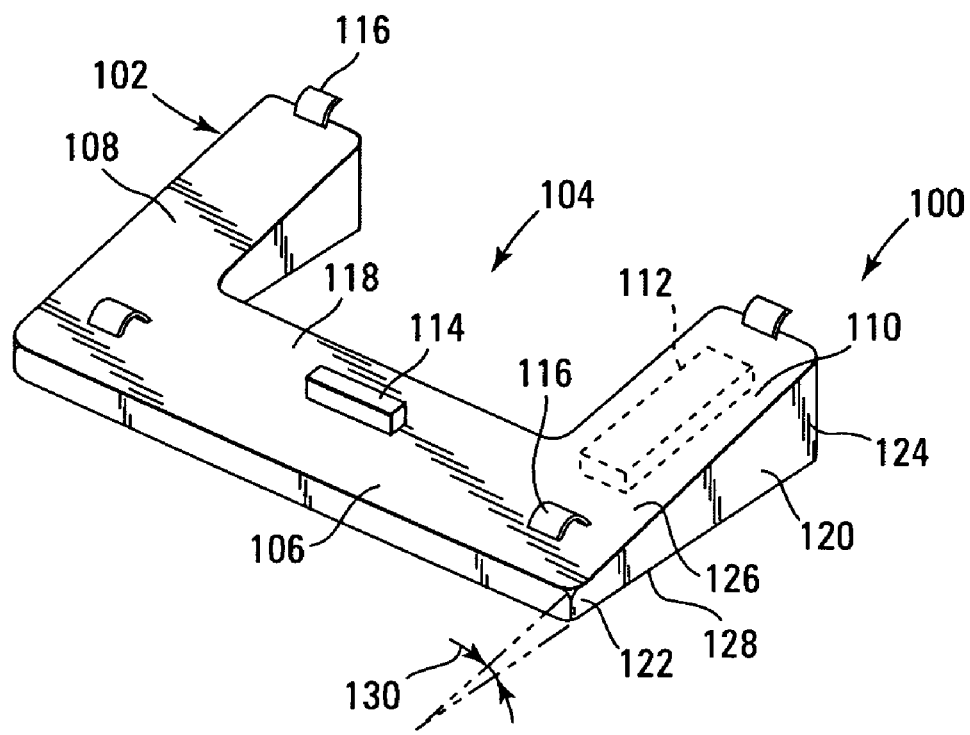
FIG. 1 is a perspective view of one embodiment of an external battery for mounting to a notebook computer.

FIG. 1 is a perspective view of one embodiment of an external battery, indicated generally at 100, for mounting on a bottom surface of a notebook computer or other dockable electronic device. Battery 100 has a housing 102. Advantageously, housing 102 includes an opening or recess 104 that enables battery 100 to be attached to a notebook computer, tablet computer, mobile device, personal digital assistant, handheld device, MP-3 device, or other dockable electronic device even when the device is docked in a docking station.

In one embodiment, housing 102 has a general U-shape defined by recess 104. Housing 102 includes a transverse member 106 and first and second lateral members 108 and 110. In one embodiment, the first and second lateral members 108 and 110 extend from the transverse member 106 in a substantially perpendicular direction. In some embodiments, first and second lateral members 108 and 110 are substantially parallel with each other.

Transverse member 106 and first and second lateral members 108 and 110 form an integral body of housing 102 that houses a number of battery cells. An example cell is shown by broken outline 112. Each of the cells is interconnected to provide a desired power configuration for battery 100. In one embodiment, the battery 100 includes 6 rectangular polymeric cells and 8 prismatic cells. In other embodiments, any appropriate number, shape and size of battery cells are included in housing 102.

In other embodiments, housing 102 comprises any of a number of other shapes that include a recess 104. For example, in one embodiment, housing 102 comprises an "L" shape, an arc of any appropriate size, a "W" shape, or any other appropriate shape that includes a recess 104 that is positionable to receive any part of a docking station or platform to enable the battery 100 to be coupled to the notebook computer or dockable electronic device while docked at the docking station.

Battery 100 connects to a bottom surface of a notebook computer or other dockable device. Battery 100 includes power connector 114. Power connector 114 provides an electrical interface between battery 100 and the notebook computer or dockable device. In one embodiment, connector 114 provides power connections to provide selected voltage levels to the notebook computer or dockable device, e.g., one or more of a positive supply, ground potential and a negative supply. In one embodiment, battery 100 provides any appropriate DC voltage level, e.g., 10.8, 14.4, or 18 volts. In some embodiments, connector 114 also includes connections for charging the battery cells 112 of battery 100. Further, in some embodiments, connector 114 includes connections to enable monitoring of the current status of the battery 100 by the notebook computer or dockable device. In some embodiments, connector 114 provides a connection to enable charging and monitoring of the battery 100 by the docking station.

Battery 100 also comprises a mechanism for attaching housing 102 to the bottom surface of a notebook computer or dockable device. In one embodiment, the mechanism is a plurality of resilient hooks 116 that are disposed on a surface 118 of housing 102. In one embodiment, two hooks 116 are disposed on transverse member 106 and one hook is disposed on each of first and second lateral members 108 and 110. In other embodiments, other mechanisms for attaching a battery to a notebook computer or dockable device are used including latching mechanisms, snap posts, spring-biased hooks, and other appropriate fasteners.

In one embodiment, battery 100 has an angled profile to tilt the notebook computer or dockable device into an ergonomically acceptable position while battery 100 is attached to the notebook computer or dockable device. As shown in FIG. 1, side 120 of housing 102 is shorter at front end 122 and taller at back end 124. Thus, top surface 126 of housing 102 is angled with respect to bottom surface 128 as indicated at 130. In one embodiment, the angle 130 is less than 8 degrees. In other embodiments, the angle 130 comprises any appropriate angle as required for a particular battery design, docking station or dockable device. Further, in some embodiments, front end 122 and back end 124 are substantially equal in height.

Figure 2:
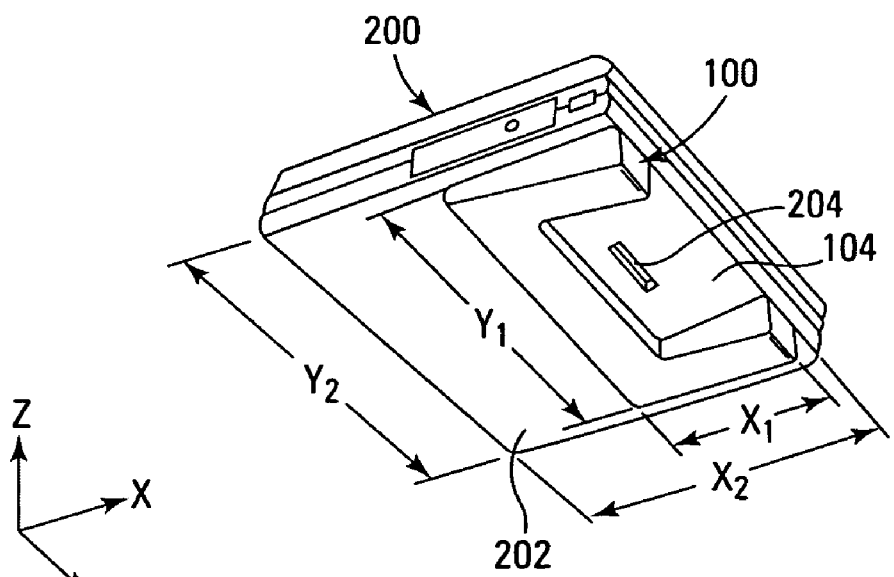
FIG. 2 is a perspective view of the external battery of FIG. 1 mounted on a notebook computer.

FIG. 2 is a perspective view of the external battery 100 mounted on notebook computer 200. Battery 100 is coupled to a bottom surface 202 of notebook computer 200. Notebook computer 200 includes a docking connector 204 on bottom surface 202. Docking connector 204 provides electrical connection between notebook computer 200 and a docking station. In some embodiments, docking connector 204 receives power signals as well as communicates with any peripheral devices, e.g., disk drives, networks, printers, etc. associated with the docking station. Advantageously, when battery 100 is coupled to notebook computer 200, recess 104 enables access to docking connector 204. Thus, notebook computer 200 is able to be docked in a docking station while battery 100 is coupled to bottom surface 202. This further enables battery 100 to be charged while notebook computer 200 is docked.

As a further advantage, battery 100 does not increase the profile of the notebook computer 200 in the X-Y plane when battery 100 is attached. As can be see in FIG. 2, battery 100 has dimensions in the X-Y plane $(X_1, Y_1)$ that are smaller than the X-Y dimensions $(X_2, Y_2)$ of notebook computer 200.

Figure 3:
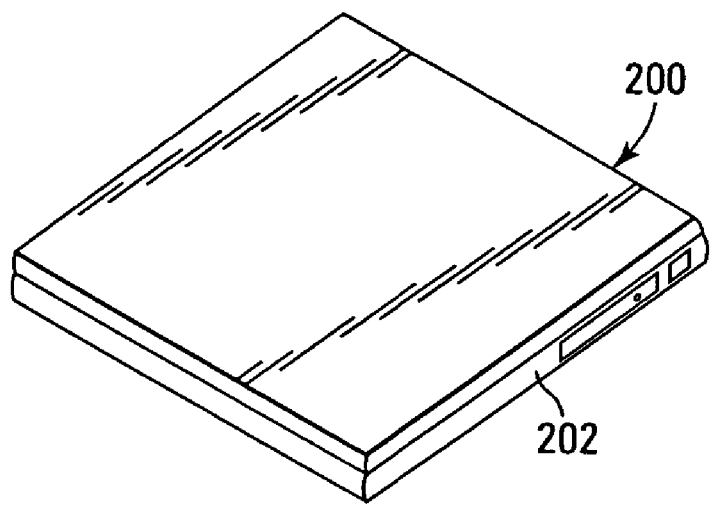
FIG. 3 is an exploded, perspective view of one embodiment of a notebook computer, external battery and docking station.
Figure 3:
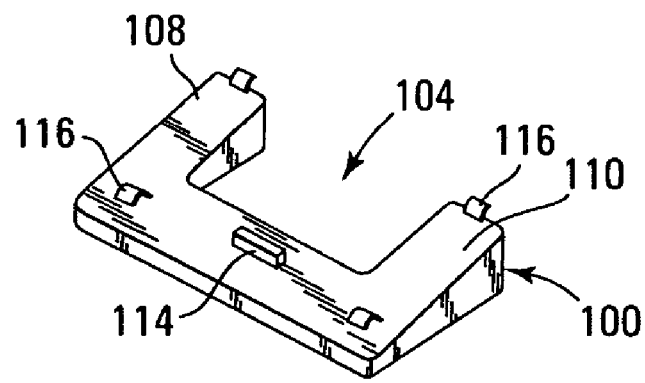
Figure 3:
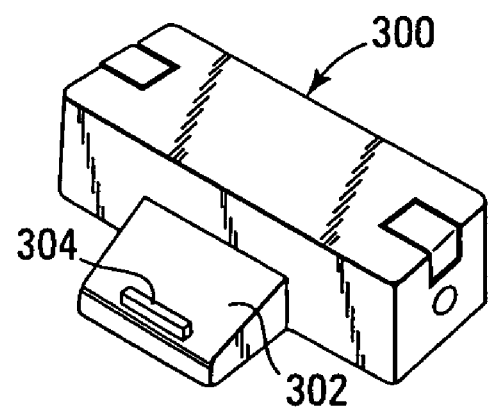

FIG. 3 is a perspective view of an external battery 100, notebook computer 200 and docking station 300. Docking station 300 includes a platform 302 that receives notebook computer 200. In one embodiment, platform 302 is disposed at an angle to provide an ergonomic placement of the notebook computer 200. Platform 302 also includes docking connector 304 that mates with docking connector 204 of notebook computer 200. Docking connector 304 provides electrical contact between notebook computer 200 and peripheral devices and networks associated with docking station 300.

Notebook computer 200 docks at docking station 300 with battery 100 coupled in place on bottom surface 202 of notebook computer 200. Recess 104 is sized to enable housing 102 of battery 100 to lie below a plane parallel to a top surface of a platform 302 of the docking station 300 when the notebook computer 200 is docked on the docking station 200. In one embodiment, at least one portion of the housing 102, e.g., first and second lateral portions 108 and 110, runs parallel with at least one side of the platform 302 of the docking station 300 when the notebook computer 200 is docked on the docking station 300. Further, in some embodiments, recess 104 is positionable to receive at least a portion of platform 302 of the docking station 300 below a surface of platform 302 that receives the notebook computer 200.

FIG. 4 is a side view of an embodiment of a notebook computer 200 docked at a docking station 300 with an external battery 100 attached to the bottom surface 202 of the notebook computer 200. In one embodiment, docking station 300 includes main unit 402. Docking platform 302 extends from a front surface 403 of main unit 402. Battery 100 is attached to notebook computer 200 and encompasses at least a portion of docking platform 302. Main unit 402 and docking platform 302 rest on surface 401. In this embodiment, battery 100 does not rest on surface 401. In other embodiments, battery 100 extends between notebook 200 and surface 401.

In one embodiment, battery 100 has an angled profile. Battery 100 has a height 404 at a front edge of battery 100 and a height 406 at a rear edge of battery 100. In one embodiment, the battery extends to the end of the bottom surface 202 of notebook computer 200. In other embodiments, the battery 100 does not extend along the extent of the bottom surface 202 of notebook computer 200. In one embodiment, height 406 is greater than height 404 by an amount that produces an ergonomic angle for computer 200. For example, in one embodiment, the profile of battery 100 produces an angle of 8 degrees for notebook computer 200.

When docked at docking station 300, front edge 408 of notebook computer 200 rests on surface 401. Further, when battery 100 is attached to notebook computer 200 and a docking station is not present, in some embodiments, the profile of battery 100 produces a similar ergonomic angle for notebook computer 200 as produced by platform 302 of docking station 300.

What is claimed is:

1. A battery for a notebook computer, the battery comprising:
    a housing having:
        a transverse member having opposite ends,
        a first lateral member that extends from one end of the transverse member,
        a second lateral member that extends from another end of the transverse member,
    at least one battery cell disposed in the housing;
    wherein the transverse member and the first and second lateral members of the housing form a recess that is operable to receive a docking station platform while the housing is coupled to the notebook computer and the notebook computer is docked.

2. The battery of claim 1, and further including at least two attachment hooks extending from the transverse member of the housing to couple the battery to the bottom of the notebook computer.

3. The battery of claim 1, and further comprising an electrical connector disposed on the transverse member of the housing to enable electrical connection to the notebook computer.

4. The battery of claim 1, wherein the first and second lateral members extend from the transverse member in a substantially perpendicular direction.

5. The battery of claim 1, wherein the first and second lateral members have an angled profile with a thickness that increases with distance from the transverse member.

6. The battery of claim 1, wherein the housing further comprises an electrical connector for enabling charging at least one of the at least one battery cell.

7. The battery of claim 1, wherein the housing further comprises an electrical connector for enabling monitoring at least one of the at least one battery cell.

* * * * *